(12) United States Patent
Choi

(10) Patent No.: US 11,614,163 B2
(45) Date of Patent: Mar. 28, 2023

(54) MOTOR CONTROL METHOD AND DEVICE FOR SHIFT-BY-WIRE SYSTEM

(71) Applicant: HYUNDAI KEFICO CORPORATION, Gyeonggi-do (KR)

(72) Inventor: Seung-Man Choi, Gyeonggi-do (KR)

(73) Assignee: Hyundai Kefico Corporation, Gyeonggi-Do (KR)

( * ) Notice: Subject to any disclaimer, the term of this patent is extended or adjusted under 35 U.S.C. 154(b) by 0 days.

(21) Appl. No.: 17/677,471

(22) Filed: Feb. 22, 2022

(65) Prior Publication Data

US 2022/0268357 A1 Aug. 25, 2022

(30) Foreign Application Priority Data

Feb. 22, 2021 (KR) ........................ 10-2021-0023617

(51) Int. Cl.
*F16H 61/32* (2006.01)
*F16H 61/02* (2006.01)
*F16H 61/00* (2006.01)

(52) U.S. Cl.
CPC ......... *F16H 61/32* (2013.01); *F16H 61/0213* (2013.01); *F16H 61/0251* (2013.01); *F16H 2061/0078* (2013.01)

(58) Field of Classification Search
CPC ................ F16H 61/32; F16H 61/0213; F16H 61/0251; F16H 2061/0078
See application file for complete search history.

(56) References Cited

U.S. PATENT DOCUMENTS

| 7,911,101 | B2* | 3/2011 | Kimura | ............... H02K 5/1732 310/90 |
| 10,563,760 | B2* | 2/2020 | Takahashi | ................. F16H 1/32 |
| 2007/0144287 | A1* | 6/2007 | Kimura | ................... F16H 61/32 74/335 |
| 2009/0091866 | A1* | 4/2009 | Inoue | ...................... F16H 61/12 361/23 |
| 2017/0248229 | A1* | 8/2017 | Nakayama | ............. H02K 11/21 |
| 2018/0058575 | A1* | 3/2018 | Khan | ...................... F16H 61/08 |
| 2019/0024789 | A1* | 1/2019 | Jeon | ........................ F16H 1/203 |

(Continued)

FOREIGN PATENT DOCUMENTS

| JP | H 05256362 A | 10/1993 |
| JP | H06-193729 A | 7/1994 |

(Continued)

*Primary Examiner* — David M Fenstermacher
(74) *Attorney, Agent, or Firm* — Fox Rothschild LLP

(57) ABSTRACT

A motor control method for a shift-by-wire system recognizes a current position of a switched reluctance (SR) motor at a point in time when a shifting request is input as a start position and determines whether the current position of the SR motor is the same as a target position, applies a current for rotating the SR motor toward the target position when the current position and the target position are not the same, counts time until a point in time when an actual motion of the SR motor is sensed, performs advanced-angle control of increasing a rotation speed of the SR motor when the counted time exceeds the time reference value, and measures a current applied to the SR motor and increases the advanced-angle control or performs retarded-angle control of decreasing the rotation speed of the SR motor, depending on the measured current value.

8 Claims, 4 Drawing Sheets

(56) References Cited

U.S. PATENT DOCUMENTS

| | | | | |
|---|---|---|---|---|
| 2019/0168730 A1* | 6/2019 | Park | ................... | F16H 63/3458 |
| 2019/0178373 A1* | 6/2019 | Choi | ...................... | H02P 25/08 |
| 2020/0003299 A1* | 1/2020 | Kim | ...................... | F16H 61/18 |
| 2020/0340579 A1* | 10/2020 | Shimada | ................. | F16H 61/32 |
| 2021/0270363 A1* | 9/2021 | Tomita | ............... | F16H 63/3483 |

FOREIGN PATENT DOCUMENTS

| | | | | |
|---|---|---|---|---|
| JP | 2017-198263 A | 11/2017 | | |
| JP | 2020-150666 A | 9/2020 | | |
| KR | 2015-0062167 A | 6/2015 | | |
| WO | 2011/052074 A1 | 5/2011 | | |
| WO | WO-2019142576 A1 * | 7/2019 | ............. | F16H 59/10 |

\* cited by examiner

MOTOR CONTROL METHOD AND DEVICE FOR SHIFT-BY-WIRE SYSTEM

CROSS REFERENCE TO RELATED APPLICATION

The present application claims under 35 U.S.C. § 119(a) the benefit of Korean Patent Application No. 10-2021-0023617, filed Feb. 22, 2021, the entire contents of which are incorporated by reference herein.

BACKGROUND

(a) Technical Field

The present disclosure relates to a motor control method and device for an electric shift-by-wire (SBW) system, more particularly, to the motor control method and device that utilize a switched reluctance (SR) motor as a shift actuator.

(b) Description of the Related Art

According to a shift-by-cable (SBC) type automatic transmission that is a shift range change type of automatic transmission in the related art, when a shift lever is moved, a detent plate is rotated by a cable, a manual valve is opened, and P-, R-, N-, and D-channels in a valve body are opened, whereby a desired shift range is selected. However, since a position of a cable should be considered in the SBC type of the related art, the design is limited based on the position of the cable, and it may be disadvantageous in terms of assembly and mass production.

A shift-by-wire type is a substitute for the SBC type in the related art. The SBW type is a technology capable of providing convenience for operation and improved safety by rotating a detent plate using a motor instead of a cable connected to the shift lever at a driver seat. The SBW type is configured such that an operation state of a shift lever is detected by a sensor or a switch, and a detent plate is rotated by a motor to operate a manual valve. In an electric vehicle and a DCT system without a hydraulic circuit, a parking gear is simply engaged and disengaged.

The detent plate has a plurality of shift ranges in which a detent roller can be statistically stabilized by a detent spring in the SBW type. The motor rotates the detent plate to appropriate positions in response to a request for changing shift ranges by a driver operating a shift lever to implement specific mechanical states of the vehicle system, whereby states desired by the driver, such as parking and driving, are implemented.

When a driver inputs a desired shift range through a shift lever, it takes some time for a vehicle control unit to receive the input, determine a control value of a motor (a control valve including a rotation direction and a rotation angle (a displacement amount of a detent plate), and actually engage the desired shift range by driving the motor on the basis of the determined control value. The timing of this process generally varies based on responsiveness of the motor.

A driver can also immediately recognize responsiveness of a motor when changing shift ranges, in particular, because there is a slight time difference between a point in time when a shift lever finishes being operated and a point in time when range information is displayed through a cluster, etc. after a range is actually engaged. However, if the responsiveness is not consistent, problems with quality are generated, which may cause deterioration of the commercial value of the vehicle.

A common brushless DC motor can perform speed feedback control using pulse width modulation (PWM) duty control, so the problem of inconsistency of response can be solved. However, a switched reluctance (SR) motor has an advantage in terms of cost, but variable PWM duty control is impossible due to the characteristics of the SR motor, so there is a need for a technology that can secure consistency of response (a constant shift time) when an SR motor is applied.

SUMMARY

An objective of the present disclosure is to provide a motor control method and device for an electric shift-by-wire system, the method and device being able to secure consistency of response (a constant shift time) only by changing software without adding or changing specific hardware in an electric shift-by-wire system that uses a switched reluctance (SR) motor as a shift actuator.

In order to achieve the objectives, according to an aspect of the present disclosure, a motor control method for a shift-by-wire (SBW) system in which shift ranges of an automatic transmission are changed by a switched reluctance (SR) motor, includes: (a) a step of recognizing a current position of the SR motor at a point in time when a shifting request is input as a start position and determining whether the current position of the SR motor is the same as a target position, when a request for changing a shift range is input; (b) a step of applying a current for rotating the SR motor toward the target position when the current position and the target position are not the same; (c) a step of coupling time until a point in time when an actual motion of the SR motor is sensed by operating a counter from the point in time when a current is applied; (d) a step of comparing the counted time with a preset time reference value and performing advanced-angle control of increasing a rotation speed of the SR motor when the counted time exceeds the time reference value; and (e) a step of measuring a current applied to the SR motor in an actual shifting period in which the SR motor is rotated toward the target position, and increasing the advanced-angle control or performing retarded-angle control of decreasing the rotation speed of the SR motor, depending on the measured current value.

The motor control method for a shift-by-wire system according to an embodiment of the present disclosure may further include (d') a step of comparing a difference between the current position of the SR motor and the start position with a preset threshold value after advanced-angle control through the step (d), between the steps (d) and (e).

When the difference between the current position of the SR motor and the start position after advanced-angle control is less than the preset threshold value as the result of comparison in the step (d'), a counter may be initialized and the method returns to the step (c) and repeats the latter steps, and when the latter steps are performed, advanced-angle control of increasing the rotation speed of the SR motor higher than the rotation speed by the previous advanced-angle control may be performed in the step (d); and when the difference between the current position of the SR motor and the start position after advanced-angle control exceeds the preset threshold value, the method may change a process to enter the step (e).

In the step (e), the measured current value may be compared with a preset reference current value, and advanced-angle control may be increased or retarded-angle control may be performed.

In the step (e), a current error value may be calculated by subtract the measured current value from the reference current value (current error value=reference current value−measured current value); and the current error value may be compared with a set threshold value, when the current error value is larger, advanced-angle control may be increased in proportion to the current error value, and when the current error value is smaller, retarded-angle control proportioned to the current error value may be performed.

In order to achieve the objectives, according to another aspect of the present disclosure, a motor control device for a shift-by-wire system includes: a switched reluctance (SR) motor configured to generate a driving force for rotating a detent plate to a target position; an encoder configured to output a corresponding electrical signal in accordance with rotation of the SR motor; and a shift-by-wire (SBW) controller configured to set a target position by analyzing a signal from a shift lever sensor that senses a position change of a shift lever, and configured to control operation of the SR motor on the basis of a signal from the encoder such that the detent plate can be rotated toward the set target position, in which the SBW controller may include a plurality of processors programmed to apply a current to the SR motor when a request for changing a shift range is input by a driver operating the shift lever, to count time from a point in time when the current is applied to a point in time when an actual motion of the SR motor is sensed, to perform advanced-angle control of increasing a rotation speed of the SR motor when the counted time exceeds a preset time reference value, to measure a current that is applied to the SR motor in an actual shifting period in which the SR motor is rotated toward a target position, and to increase the advanced-angle control or perform retarded-angle control of decreasing the rotation speed of the SR motor, depending on the measured current value.

The processor may include: a determiner configured to recognize a current position of the SR motor at a point in time when a request for changing a shift range is input as a start position and to determine whether the current position of the SR motor and a target position are the same; a current controller configured to apply a current for rotating the SR motor toward the target position when the current position and the target position are not same as the result of determination by the determiner; a counter unit configured until a point in time when an actual motion of the SR motor is sensed by operating a counter from a point in time when a current is applied by the current controller; and a comparer configured to compare the time counted by the counter unit with a preset time reference value, and the current controller may include a logic programmed to perform advanced-angle control of increasing a rotation speed of the SR motor when the time counted by the counter unit exceeds the time reference value, and to further increase the advanced control or perform retarded-control of decreasing the rotation speed of the SR motor, depending on a current value measured in an actual shifting period in which the SR motor is rotated toward the target position.

According to the embodiment of the present disclosure, it is possible to secure consistency of response (a constant shift time) only by changing software without adding or changing specific hardware in an electric shift-by-wire system that uses an SR motor as a shift actuator, and accordingly, it is possible to prevent deterioration of a commercial value or a safety accident due to shift delay.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION OF THE DISCLOSURE

Figure 1:
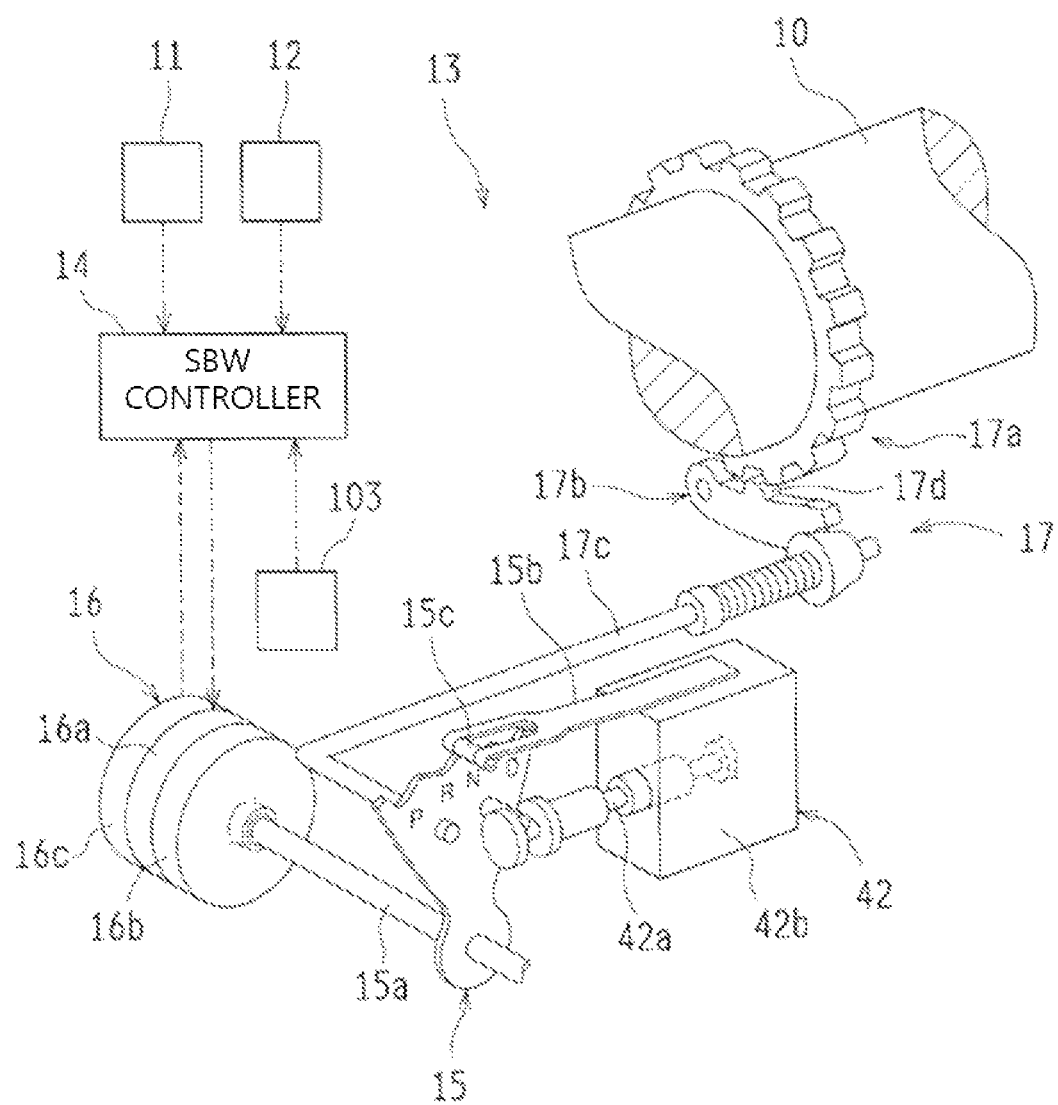
FIG. 1 is a perspective view showing a range change mechanism of a shift-by-wire system that is applied to an automatic transmission.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure are described in detail with reference to the drawings.

The terminology used herein is for the purpose of describing particular embodiments only and is not intended to limit the present disclosure. Singular forms are intended to include plural forms unless the context clearly indicates otherwise.

Terms used in the specification, "first", "second", etc., may be used to describe various components, but the components are not to be construed as being limited to the terms. The terms are used only to distinguish one component from another component.

In the following description referring to the accompanying drawings, the same components are given the same reference numerals and are not repeatedly described. However, in describing the present disclosure, detailed descriptions of well-known technologies will be omitted so as not to obscure the description of the present disclosure with unnecessary detail.

First, the mechanical configuration of a shift range change mechanism of a shift-by-wire system is generally described.

FIG. 1 is a perspective view showing a shift range change mechanism of a shift-by-wire system that is applied to an automatic transmission.

Referring to FIG. 1, a shift range change mechanism 13 includes a detent plate 15 that is operated to determine the position of a spool 42a of a manual valve 42, and a shift actuator 16 that generates a driving force for rotating the detent plate 15. The shift actuator 16 may be an electric type and is operated by power from a battery mounted in a vehicle in the same way as a starter motor (not shown).

The shift range change mechanism 13 is connected to a parking mechanism 17 to be able to operate together. The detent plate 15 of the range change mechanism 13 is rotated by the shift actuator 16 and pushes or pulls the spool 42a of the manual valve 42 or a parking rod 17c of the parking mechanism 17 step by step, thereby determining the positions thereof. A detent mechanism is composed of the detent plate 15, a rotary shaft 15a, and a detent spring 15b.

The detent spring 15b may be supported on the valve body 42b of the manual valve 42 and the detent plate 15 may be formed substantially in a fan shape. The portion that is the rotation center of the detent plate 15 is mechanically connected to the shift actuator 16 through the rotary shaft 15a. Accordingly, the detent plate 15 is rotated in synchronization with the motor 16a of the shift actuator 16.

A shift range determination surface 150 (hereafter, referred to as a 'position determination surface') composed of continuous curved waves is formed on the edge of the detent plate 15. A roller 15c of the detent spring 15b is seated in a groove at a specific position on the position determination surface 150, whereby a position-determined state (shift range-changed state) can be maintained.

Four grooves corresponding to range positions P, R, N, and D, respectively, of the manual valve 42 that is operated with the detent plate 15 may be formed on the position determination surface. A ridge is formed between a groove and an adjacent groove, for example, between a P-range groove and an R-range groove or between an R-range groove and an N-range groove. The ridge is the boundary between adjacent shift ranges.

The pitch between a groove determining a shift range and an adjacent range is constant, so the pitch between a ridge, which is the boundary between adjacent shift ranges, and an adjacent ridge is also constant. Of course, depending on cases, the pitch between the P-range groove and the R-range groove may be made larger than the pitches of the other grooves. Accordingly, all of the pitches between the grooves are not the same.

The shift actuator 16 is driven in response to a signal that is output when a driver operates the shift lever 11, and accordingly, the roller 15c of the detent spring 15b is positioned into any one of the four grooves (the grooves determining the P-, R-, N-, and D-ranges, respectively). Accordingly, the detent plate 15 is maintained with the position thereof determined at positions corresponding to the positions of the manual valve 42, respectively.

The shift actuator 16 may include an electric motor, a switch reluctance (SR) motor 16a (hereafter, referred to as a 'motor' for the convenience of description), a reducer 16b that reduces rotation of the motor, and an encoder 16c that senses the rotation direction and rotation angle of the motor 16a and outputs corresponding electrical signals to the SBW controller 14 when the motor 16a is rotated.

The rotary shaft 15a may be connected to an output shaft (not shown) of the reducer 16b to rotate together by a spline, etc., and the parking mechanism 17 serves to change an output shaft 10 of an automatic transmission 1 into a lock state in which it cannot rotate and an un-lock state in which it can rotate. The parking mechanism 17 may include a parking gear 17a formed on the edge of the output shaft 10, a parking lock pawl 17b, a parking rod 17c, etc.

The fundamental operation of the shift range change mechanism 13 configured in this way is briefly described hereafter.

When a driver of a vehicle operates the shift lever 11 or the parking switch 12, one of the parking range P, the reverse range R, the neutral range N, and the drive range D of the automatic transmission 1 is selected. Accordingly, a signal is output from a shift lever sensor 103 or the parking switch 12, and an SBW controller 14 receives the output signal and recognizes a selected target range (or a target range) P, R, N, or D.

The SBW controller 14 determines an instruction value (a duty value as a control valve including a rotation direction and a rotation angle) of the shift actuator 16 on the basis of the information about the distance between the current position and a newly recognized target position P, R, N, or D, and rotates forward or backward the motor 16a by a predetermined angle at a timing determined on the basis of the determined instruction value. Accordingly, the rotary shaft 15a and the detent plate 15 are rotated a predetermined angle.

The timing may be determined by a Hall sensor (not shown) that uses a Hal element installed in the motor and having a Hall effect, and when the motor 16a is rotated, the encoder 16c senses a signal change and provides a signal corresponding to the current shift range to the SBW controller 14. The SBW controller 14 performs feedback control on the motor 16a on the basis of the signals from the encoder 16c and the Hall sensor 16d.

For example, when the shift lever 11 is operated from the neutral range N to the drive range D, a target position signal is changed N→D. The SBW controller 14 receiving this signal sets a target rotation angle corresponding to the selected target position D, determines a corresponding instruction value (duty valve), and allows for electricity transmission to the motor 16a by the determined instruction value.

Further, when electricity is transmitted, the motor 16a is driven, and the output shaft thereof is rotated, the SBW controller 14 receives a signal corresponding to the rotation angle in real time from the encoder 16c. The SBW controller recognizes the rotation angle and direction of the motor 16a in real time from the signal provided from the encoder 16c and performs feedback control on the motor 16a such that the rotation angle of the motor 16a becomes the same as the target rotation angle.

According to this control, the detent plate 15 is rotated counterclockwise by a predetermined angle in FIG. 1, the roller 15*c* of the detent spring 15*d* is separated out of the groove of N, slides over one adjacent ridge, and is then positioned into the adjacent groove D. As a result, the spool 42*a* of the manual valve 42 axially slides and the range of the manual valve 42 is changed N→D.

When a driver manually operates the parking switch 12 and the parking range P is selected, the parking rod 17*c* is pushed and the parking lock pawl 17*b* is lifted by rotation of the detent plate 15, whereby the claw 17*d* is inserted between teeth of the parking gear 17*a*. Accordingly, the output shaft 10 of the automatic transmission 1 is locked and the manual valve 42 is stopped at the position P.

According to the shift range change mechanism 13 operating in this way, when a load in the motor is increased due to external environmental conditions (e.g., an extremely low temperature, aging of relevant parts, etc.), the response speed of the motor decreases. However, unlike a servo motor, feedback control of the SR motor through pulse width modulation (PWM) duty control is impossible for the characteristics, so there is a need for another access for securing consistent responsiveness.

Therefore, the present disclosure provides a motor control device for an electric shift-by-wire system, the motor control device being able to solve the problem with responsiveness of an SR motor by controlling the speed of the motor using the effect of recovering current rise delay when U-phase electricity transmission is performed +1 task earlier than the actual pattern in accordance with the responsiveness (reaction speed) of the motor and current information (current information actually applied to the motor( ) when the motor is operated in response to a request for changing a shift range.

A motor control device for a shift-by-wire system according to an embodiment of the present disclosure that is applied to a shift-by-wire system is described hereafter.

Figure 2:
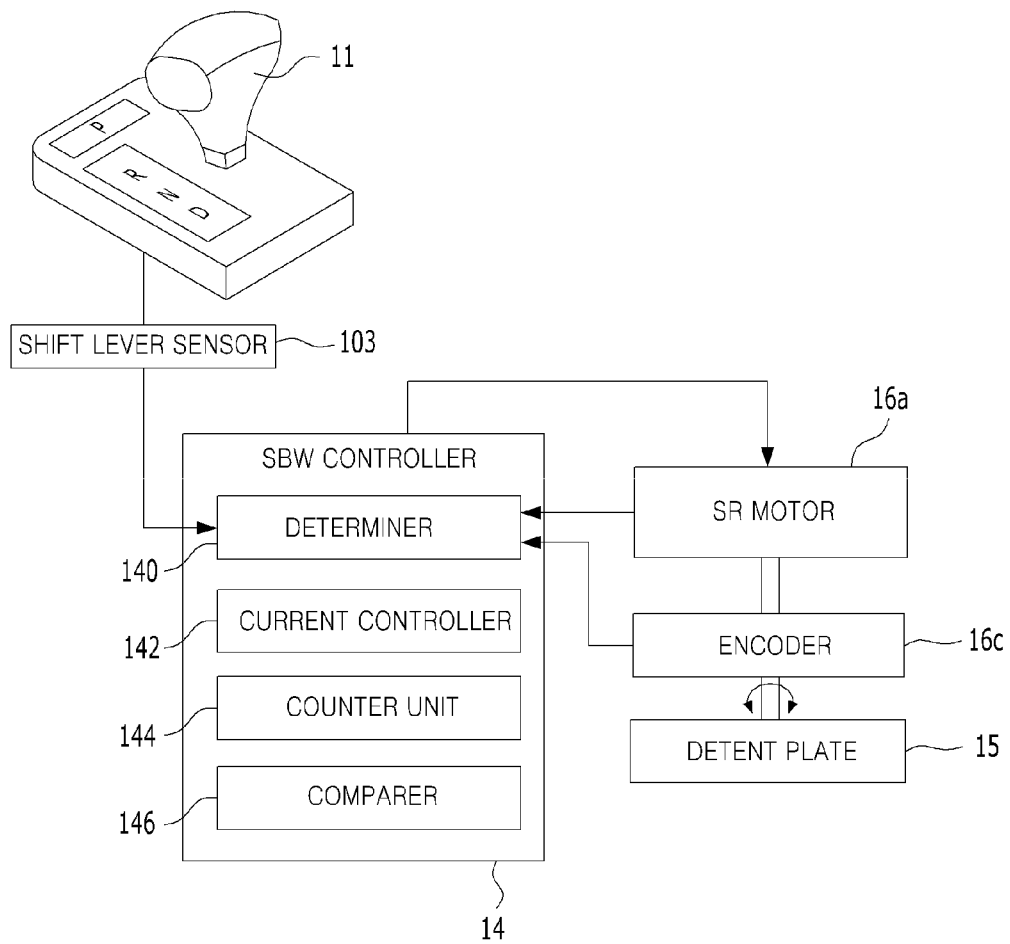
FIG. 2 is a schematic view of a motor control device for a shift-by-wire system according to an embodiment of the present disclosure.

FIG. 2 is a schematic view of a motor control device for a shift-by-wire system according to an embodiment of the present disclosure.

Referring to FIG. 1, a motor control device according to an embodiment of the present disclosure includes the motor (SR motor) 16*a*, encoder 16*c*, and SBW controller 14 described above. The motor 16*a* is controlled by the SBW controller 14 to rotate the detent plate 15 to a target position and the SBW controller 14 recognizes whether the detent plate 15 has entered the target position on the basis of a signal from the encoder 16*c*.

The SBW controller 14, as described above, sets a target position by analyzing a signal output from the shift lever sensor 103 when the shift lever 11 is operated. Further, the SBW controller 14 controls the motor 16*a* to rotate the detent plate 15 toward the set target position. In particular, the SBW controller 14 recognizes the rotation angle of the motor 16*a* and controls the motor 16*a* from a signal of the encoder 16*c* such that the rotation angle becomes the same as a target rotation angle.

In the present disclosure, the SBW controller 14, in particular, includes a plurality of processors programmed to apply a current to the motor in response to a request for changing a shift range when the shift lever is operated, to determine whether responsiveness is appropriate on the basis of the time from the point in time when the current is applied to the point in time when an actual motion of the motor is sensed, and to compensate for responsiveness through advanced-angle control that increases the rotation speed of the motor when the responsiveness is deteriorated.

In particular, the SBW controller 14 includes a plurality of processors programmed to apply a current to the motor when a request for changing a shift range is input by a driver operating the shift lever, to count the time from the point in time when the current is applied to the point in time when an actual motion of the motor is sensed, to perform advanced-angle control that increases the rotation speed of the motor when the counted time exceeds a preset time reference value, to measure a current that is applied to the motor in an actual shifting period in which the motor is rotated toward a target position, and to increase the advanced-angle control or decrease the rotation speed of the motor, depending on the measured current value.

The processors include: a determiner 140 that recognizes the current position of the motor 16*a* at the point in time when a request for changing a shift range is input as a start position and determines whether the current position of the motor 16*a* and a target position are the same; and a current controller 142 that applies a current for rotating the motor 16*a* toward the target position when the current position and the target position are not same as the result of determination by the determiner 140.

The processors further include: a counter unit 144 that counts the time until a point in time when an actual motion of the motor 16*a* is sensed by operating a counter from the point in time when a current is applied by the current controller 142; and a comparer 146 that compares the time counted by the counter unit 144 with a preset time reference value. The time reference value is required through repeated experiments or a simulation under the same simulated environment and may be time required for providing optimal responsiveness.

The current controller 142 may include a program (a control logic) programmed to determine that operation of the motor 16*a* is delayed due to a large actual load (responsiveness is deteriorated) and to compensate for delay of responsiveness by increasing the rotation speed of the motor 16*a* through advanced-angle control when the time counted by the counter unit 144 (the time from the point in time when a current is applied to the motor 16*a* to the point in time when an actual motion of the motor 16*a* is sensed) exceeds the time reference value.

The program may include a program that appropriately adjusts the responsiveness of the motor 16*a* by increasing the advanced-angle control in accordance with a current value actually applied to the motor 16*a* and measured through current measurement by convert the voltage of a shunt resistor into a current or by performing retarded-angle control of decreasing the rotation speed of the motor 16*a*, when the motor 16*a* enters an actual shifting period in which the motor 16*a* rotates toward a target position.

Figure 3:
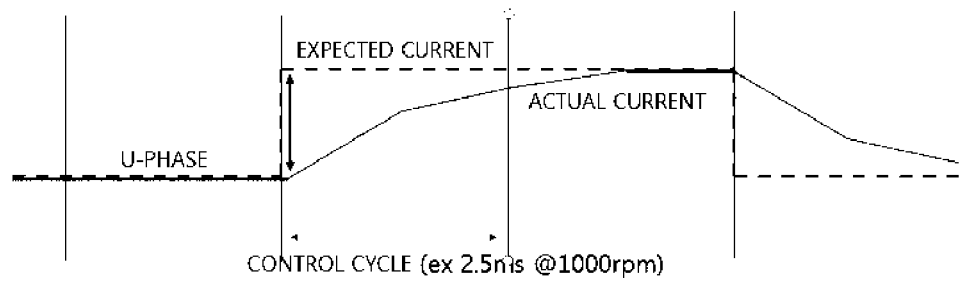
FIG. 3 is a reference view of a present disclosure for describing advanced-angle control.
Figure 3:
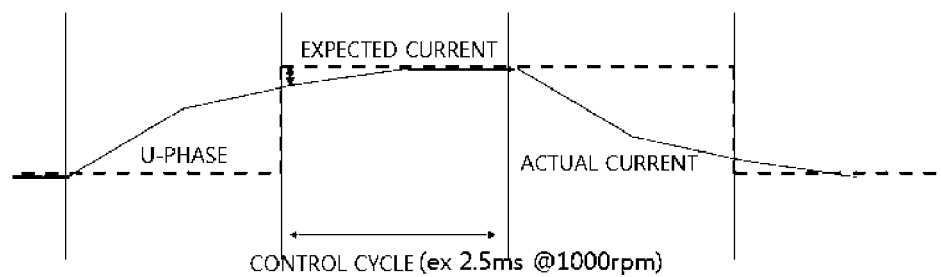

For reference, the advanced-angle control, as shown in the reference view of FIG. 3, means control of increasing the speed of the motor 16*a* using the effect of recovering current rise delay when U-phase electricity transmission is performed +1 task earlier than the actual pattern, and the retarded-angle control means control of decreasing the speed of the motor 16*a* by performing U-phase electricity transmission −1 task later than the actual pattern.

A motor control process that is performed by the motor control device for an electric shift-by-wire system according to an embodiment of the present disclosure described above is described in more detail with reference to the control flowchart of FIG. 4. For the convenience of description, the components shown in FIGS. 1 and 2 are described with reference to their reference numerals.

Figure 4:
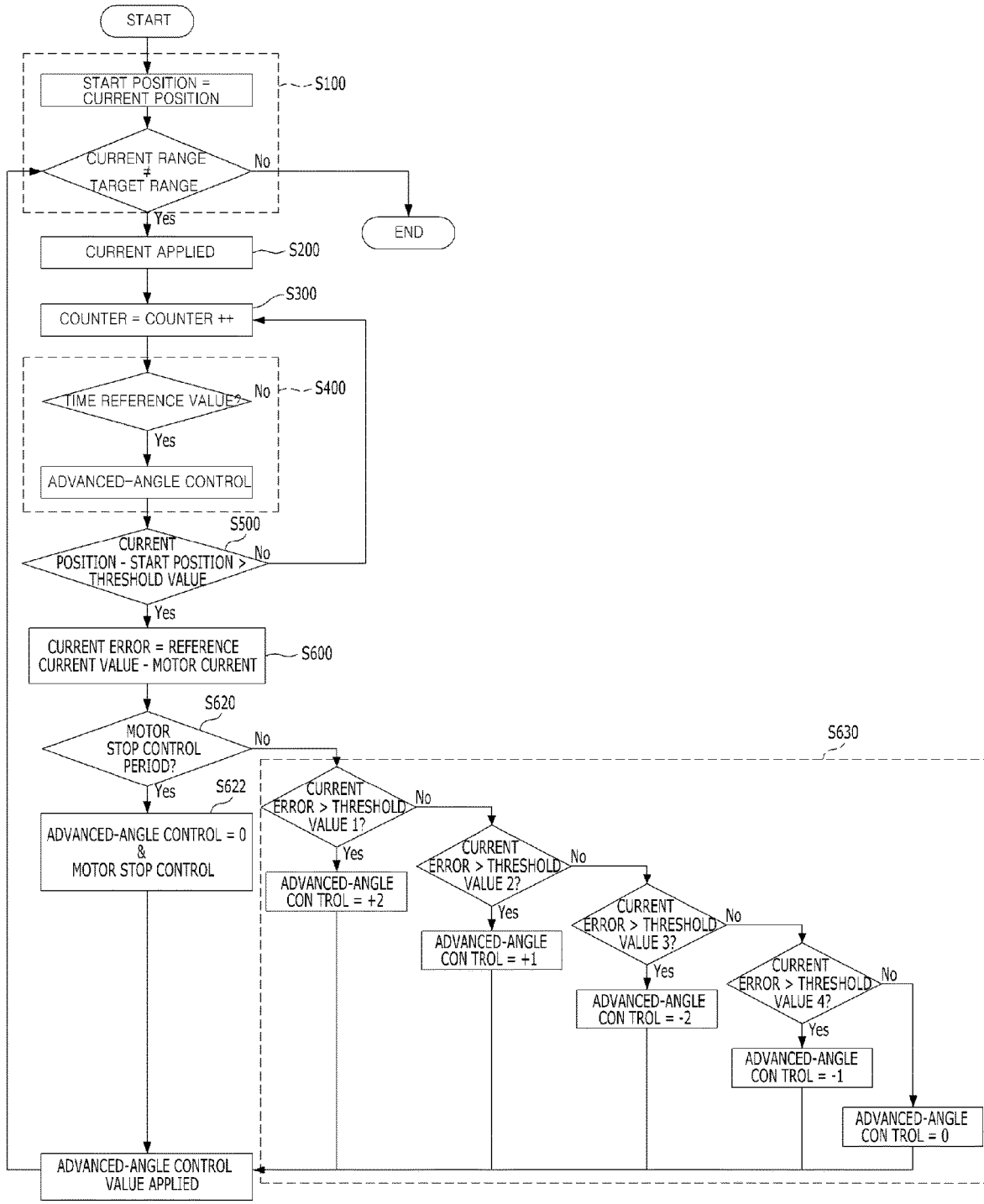
FIG. 4 is a control flowchart sequentially showing a series of processes of controlling a motor in a shift-by-wire system.

FIG. 4 is a control flowchart sequentially showing a series of motor control processes is performed by the motor control device for an electric shift-by-wire system.

Referring to FIG. 4, a motor control method for an electric shift-by-wire system starts with step S100 of recognizing the current position of the motor 16a at the point in time when a shifting request as a start position and of determining whether the current position of the motor 16a and a target position are the same, when a request for changing a shift range is input. If the current position of the motor 16a and the target position are the same in step S100, it is determined that a shift range has been changed already in response to a request for changing a shift range, and the process is ended without progressing.

However, when the current position and the target position are not the same as the result of determination in step S100, a step S200 of applying a current for rotating the motor 16a toward the target position to the motor 16a is performed. In step S200, a target rotation angle is determined on the basis of distance information to the selected target position (target shift range) from the current position and electricity transmission is allowed until the rotation angle of the motor 16a reaches the target rotation angle.

When a current for rotating the motor 16a to the target position is applied in step S200, a step S300 of counting the time until the point in time when an actual motion of the motor 16a is sensed by operating a counter from the point in time when the current is applied is performed. In step S300, the point in time when an output change of the encoder 16c is sensed after the current is applied may be recognized as the point in time when an actual motion of the motor 16a is sensed.

The time counted in step S300 is provided as a comparison value for comparison with a time reference value set in next step S400. In step S400, predetermined control of determining that the rotation speed of the motor decreases under an initial setting speed and of compensating the decreased reaction speed by increasing the rotation speed of the motor 16a, when the time counted in step S300 exceeds the time reference value.

The predetermined control may be advanced-angle control of increasing the rotation speed of the motor 16a. The advanced-angle control means increasing the speed of the motor 16a using the effect of recovering current rise delay when U-phase electricity transmission is performed +1 task earlier than the actual pattern, as described above.

However, when the time counted in step S300 is smaller than the time reference value, it is determined that the rotation speed of the motor 16a is an appropriate speed and the process may progress to step S500 to be performed next without going through predetermined control for increasing the rotation speed of the motor 16a, that is, the advanced-angle control step.

After step S400, step S500 of comparing the difference between the current position of the motor 16a and the start position with a preset threshold value is performed. If the difference between the current position of the motor 16a and the start position after advanced-angle control is less than the preset threshold value in step S500, it means that the motor 16a has not sufficiently moved to the target position even though advanced-angle control was performed, so the counter is initialized and the process returns to step S300.

In particular, when the difference between the current position of the motor 16a and the start position after advanced-angle control is less than the preset threshold value as the result of comparison through step S500, the counter is initialized and then the process returns to step S300 and the latter processes are repeated. When the processes are repeated, advanced-angle control of increasing the rotation speed of the motor 16a higher than the rotation speed by the previous advanced-angle control is performed (for example, U-phase electricity transmission is performed +2 task earlier than the actual pattern).

However, when the difference between the current position of the motor 16a and the start position after advanced-angle control exceeds the preset threshold value as the result of comparison through step S500, it is determined that the motor 16a has entered the actual shifting period in which the motor is rotated toward the target position, and the process progress to step S600 to be described below.

In step S600, a current that is applied to the motor 16a in the actual shifting period in which the motor 16a is rotated toward the target position is measured, and the advanced-angle control is increased or retarded-angle control of decreasing the rotation speed of the motor 16a is performed, depending on the measured current value. In step S600, the advanced-angle control is increased or retarded-angle control of decreasing the rotation speed by comparing the measured current value with a preset reference current value may be performed.

Step S600 is described in more detail.

When the process enters step S600, a current error value is calculated first S610. The current error value may be obtained by subtracting the current value (measured current value) of the motor 16a measured in the actual shifting period from the reference current value, that is, may be calculated through a simple equation [current error value=reference current value−measured current value].

The current value of the motor 16a, that is, the reference current value that is the reference for calculating the current error value may be set as different values, depending on a battery voltage. This is for preventing a current rise due to a battery voltage difference from being misrecognized as an increase of the load on the motor 16a.

When the current error value is derived through step S610, whether a stop control period of the motor 16a in which the actual rotation angle of the motor 16a (calculated from encoder output) and the target rotation angle are closed to each other is reached (whether the rotation position of the motor 16a approaches the target position is determined) (S620). When it is determined that the stop control period of the motor 16a has been reached, advanced-angle control of the motor 16a is stopped and stop control of the motor 16a (2-phase electricity transmission) is performed so that the motor 16a can be stopped at the target position (S622).

However, when the motor 16a does not reach the stop control period, the current error value calculated through step S610 is compared with predetermined set threshold values. When the current error value is larger, advanced-angle control proportioned to the current error value is performed, and when the current error value is smaller, retarded-angle control proportioned to the current error value is performed.

For example, as exemplified in FIG. 4, the current error value is compared a set threshold value 1 that is the largest threshold value, and when the current error value is larger than the set threshold value 1 (current error value>set threshold value 1), advanced-angle control is increased by +2 task. Further, when the current error value is smaller than the set threshold value 1 (current error value<set threshold value 1), the current error value is compared again with a set threshold value 2 that is smaller than the set threshold value 1.

When the current error value is larger than the set threshold value 2 (set threshold value 1>current error value), as the result of comparison, advanced-angle control is increased only by +1 task. When the current error value is smaller than the set threshold value 2 (current error value<set threshold value 2), the current error value is compared again with a set threshold value 3 that is smaller than the set threshold value 2, and when the current error value is smaller than the set threshold value 3, advanced-angle control is decreased by −2 task (−2 task retarded-angle control).

However, when the current error value is larger than the set threshold value 3, the current error value is compared with a set threshold value 4 that is larger than the set threshold value 3 and smaller than the set threshold value 2. When the current error value is smaller than the set threshold value 4 (set threshold value 3<current error value<set threshold value 4), advanced-angle control is decreased only by −1 task (−1 task retarded-angle control), and when the current error value is larger than the set threshold value 4 (set threshold value 4<current error value<set threshold value 2), advanced-angle or retarded-angle control may not be performed.

According to the embodiment of the present disclosure described above, it is possible to secure consistency of response (a constant shift time) only by changing software without adding or changing specific hardware in an electric shift-by-wire system that uses an SR motor as a shift actuator, and accordingly, it is possible to prevent deterioration of a commercial value or a safety accident due to shift delay.

Only a specific embodiment was described in the above detailed description. The present disclosure should not be construed as being limited to the specific embodiment described above, but should be construed as including all changes, equivalents, and substitutions within the spirit of the present disclosure defined in the claims.

What is claimed is:

1. A motor control method for a shift-by-wire (SBW) system in which shift ranges of an automatic transmission are changed by a switched reluctance (SR) motor, the motor control method comprising:
   (a) a step of recognizing a current position of the SR motor at a point in time when a shifting request is input as a start position and determining whether the current position of the SR motor is the same as a target position, when a request for changing a shift range is input;
   (b) a step of applying a current for rotating the SR motor toward the target position when the current position and the target position are not the same;
   (c) a step of counting time until a point in time when an actual motion of the SR motor is sensed by operating a counter from the point in time when a current is applied;
   (d) a step of comparing the counted time with a preset time reference value and performing advanced-angle control of increasing a rotation speed of the SR motor when the counted time exceeds the time reference value; and
   (e) a step of measuring a current applied to the SR motor in an actual shifting period in which the SR motor is rotated toward the target position, and increasing the advanced-angle control or performing retarded-angle control of decreasing the rotation speed of the SR motor, depending on the measured current value.

2. The motor control method of claim 1, further comprising:
   (d') a step of comparing a difference between the current position of the SR motor and the start position with a preset threshold value after advanced-angle control through the step (d), between the steps (d) and (e).

3. The motor control method of claim 2, wherein when the difference between the current position of the SR motor and the start position after advanced-angle control is less than the preset threshold value as the result of comparison in the step (d'), a counter is initialized and the method returns to the step (c) and repeats the latter steps, and when the latter steps are performed, advanced-angle control of increasing the rotation speed of the SR motor higher than the rotation speed by the previous advanced-angle control is performed in the step (d).

4. The motor control method of claim 2, wherein when the difference between the current position of the SR motor and the start position after advanced-angle control exceeds the preset threshold value as the result of comparison in the step (d'), the method changes a process to enter the step (e).

5. The motor control method of claim 1, wherein in the step (e), the measured current value is compared with a preset reference current value, and advanced-angle control is increased or retarded-angle control is performed.

6. The motor control method of claim 5, wherein a current error value is calculated by subtract the measured current value from the reference current value (current error value=reference current value−measured current value), and
   the current error value is compared with a set threshold value, when the current error value is larger, advanced-angle control is increased in proportion to the current error value, and when the current error value is smaller, retarded-angle control proportioned to the current error value is performed.

7. A motor control device for a shift-by-wire system, comprising:
   a switched reluctance (SR) motor configured to generate a driving force for rotating a detent plate to a target position;
   an encoder configured to output a corresponding electrical signal in accordance with rotation of the SR motor; and
   a shift-by-wire (SBW) controller configured to set a target position by analyzing a signal from a shift lever sensor that senses a position change of a shift lever, and configured to control operation of the SR motor on the basis of a signal from the encoder such that the detent plate can be rotated toward the set target position,
   wherein the SBW controller includes a plurality of processors programmed to apply a current to the SR motor when a request for changing a shift range is input by a driver operating the shift lever, to count time from a point in time when the current is applied to a point in time when an actual motion of the SR motor is sensed, to perform advanced-angle control of increasing a rotation speed of the SR motor when the counted time exceeds a preset time reference value, to measure a current that is applied to the SR motor in an actual shifting period in which the SR motor is rotated toward a target position, and to increase the advanced-angle control or perform retarded-angle control of decreasing the rotation speed of the SR motor, depending on the measured current value.

8. The motor control device of claim 7, wherein the processors include:
   a determiner configured to recognize a current position of the SR motor at a point in time when a request for changing a shift range is input as a start position and to determine whether the current position of the SR motor and a target position are the same;

a current controller configured to apply a current for rotating the SR motor toward the target position when the current position and the target position are not same as the result of determination by the determiner;

a counter unit configured until a point in time when an actual motion of the SR motor is sensed by operating a counter from a point in time when a current is applied by the current controller; and a comparer configured to compare the time counted by the counter unit with a preset time reference value, and wherein the current controller performs advanced-angle control of increasing a rotation speed of the SR motor when the time counted by the counter unit exceeds the time reference value, and further increases the advanced control or performs retarded-control of decreasing the rotation speed of the SR motor, depending on a current value measured in an actual shifting period in which the SR motor is rotated toward the target position.

\* \* \* \* \*